May 27, 1924.
G. M. MILES
PROCESS FOR THE MILLING OF RICE
Filed March 20, 1919
1,495,561
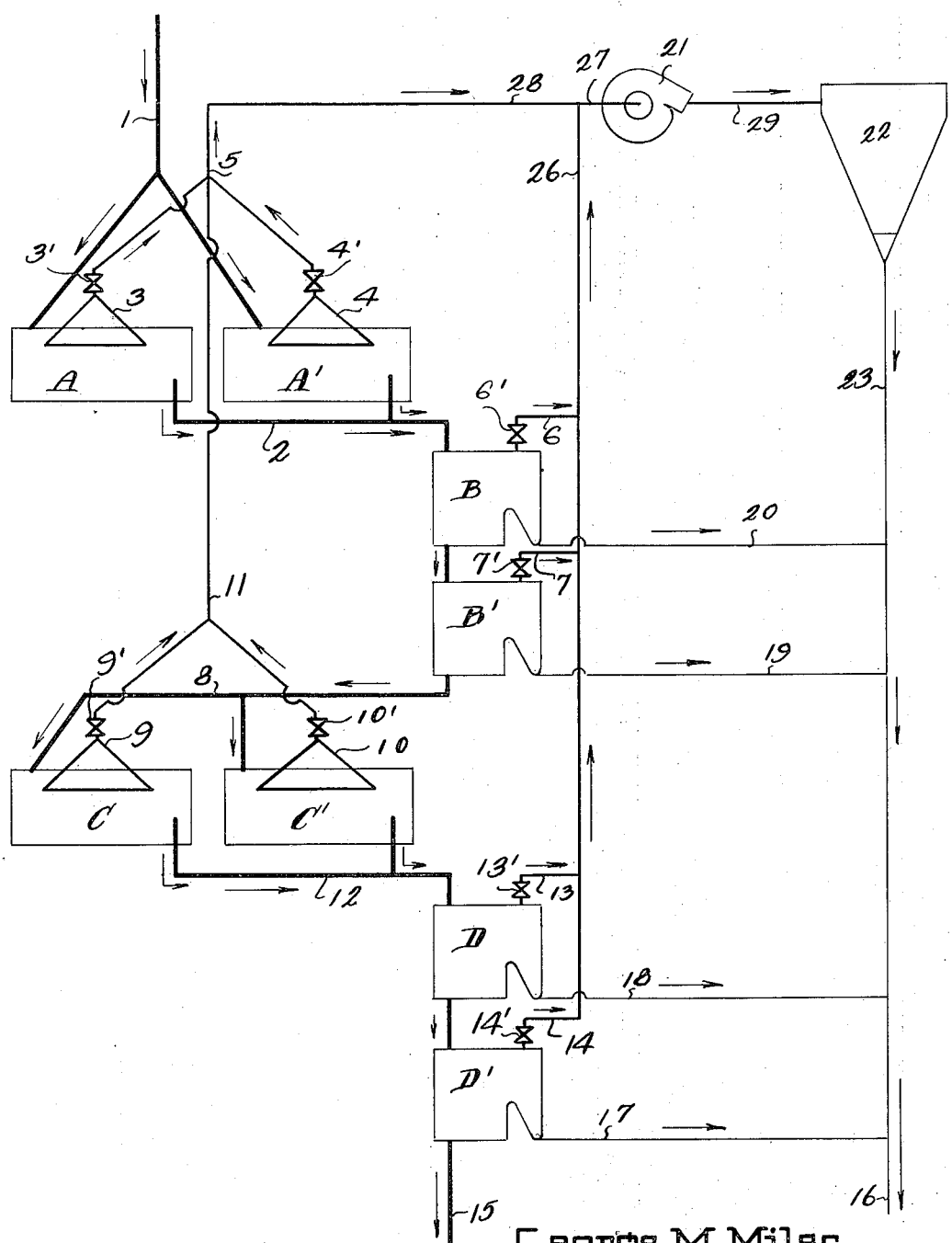
George M. Miles
Inventor Patented May 27, 1924.

1,495,561

UNITED STATES PATENT OFFICE.

GEORGE M. MILES, OF HOUSTON, TEXAS, ASSIGNOR OF ONE-HALF TO STANDARD RICE COMPANY, INC., OF HOUSTON, TEXAS.

PROCESS FOR THE MILLING OF RICE.

Application filed March 20, 1919. Serial No. 283,690.

*To all whom it may concern:*

Be it known that I, GEORGE M. MILES, a citizen of the United States, residing at Houston, in the county of Harris and State of Texas, have invented a new and useful Process for the Milling of Rice, of which the following is a specification.

The invention relates to certain new and useful improvements in processes for the milling of rice and pertains more particularly to that art in which the rice is treated to remove the bran or cellular material before subjecting it to final treatment whereby it is fitted for the market. It has for its main object to insure a thorough removal of bran or cellular material from the rice while being passed through a series of cooperating means whereby the hulls or fiber is mechanically separated from the rice kernel and this bran or cellular matter then pneumatically removed.

A further object of the invention is the application of the variable air suction to each huller, thus maintaining absolute control and preventing any waste of rice.

Importance is attached to the pneumatic system in that it eliminates the use of wire mesh rotary reels which are used at present and are a source of continual waste, dissatisfaction and always a burdensome expense.

A further object of the invention is the provision of an improved process for the milling of rice which embodies hullers to loosen or break the bran from the kernel, and a series of aspirators wherein the bran may be effectively segregated from the rice kernels in such manner that the kernels will not be broken or discharged with the bran.

Other objects and advantages of this invention will be apparent during the course of the following detailed description.

In the accompanying drawing, the view diagrammatically represents the improved process after the manner known to those skilled in the art as a "milling program".

It being understood that the process is solely designed for the complete removal of all bran or cellular material without the use of a rotary screen which becomes clogged and worn, and is a continual source of inconvenience and irregularities, the process broadly comprises the regular first A—A' and second C—C' break hullers in connection with double aspirators B—B', and D—D' of any standard type, all operating under a suction device so arranged as to pneumatically transfer all such dust, bran or cellular material through a suitable dust collector 22 and into a proper receiving box connected to conveyor 16.

The first break hullers are connected to suction funnels 3, and 4 so set within the top of these hullers A—A' as to gently remove the bran or cellular matter directly as it is broken from the grain, without conveying any of the whole or broken rice grains into the dust collector provided for this waste bran. Valves 3' and 4' or other controls may be placed in connection with funnels 3 and 4, respectively to permit of adjustment as to the amount of suction at said funnels. It is possible to take up anywhere from 30% to 70% of the bran at the first break hullers by adjustment or controls 3' and 4'. However, a good average is the removal of 40% of the bran in this operation.

The rice continues through conveyor 2 into double aspirators B and B' which expose the grain to a thorough cleaning by reason of the spreading of the stock, by the vibrating or rotary motion of the trays contained therein and permitting the free action of the air drawn by aspirating fan 21 through the branch pipes 6 and 7 which may also be provided with valves 6' and 7' respectively. This air lifts the bran and dust within the shaft 26 and deposits it, through the dust collector 22, into a receiving box connected to conveyor 16.

The rice is then passed through shaft 8 into second break hullers C, C' which are provided in the same way as first break hullers A, A' with suction funnels 9, 10 valve controlled as at 9' and 10' respectively, which remove any loosened bran and convey it up shaft 11 to aspirating fan 21, thence through dust collector 22 and finally into a receiving box connected to conveyor 16. This operation leaves the rice comparatively free from all bran or cellular matter and for final cleaning the grains are conveyed through shaft 12 into two aspirators D, D' which continue the removal of all bran and cellular material in an identical manner to aspirators B, B'. The air drawing the waste bran through shafts 13 and 14, valve controlled as at 13' and 14' respectively, into the main shaft 26 and then through the previously outlined course into a receiving box connected to conveyor 16. The cleaned rice is discharged from aspirator D' into a pipe 15 and thence transferred to sacks or other suitable receivers.

The double aspirators B, B'—D, D' preferably of the revolving disc type, remove in their operation, any bran or cellular matter too heavy to be carried by the counterbalanced air currents through the shafts 26 to the conveying pipe 23, and these heavy waste particles are transferred by gravity through the shafts 17, 18, 19, 20 to the conveying pipe 23 and thence into receiver connected to conveyor 16.

The term aspirator as used in this specification and the claims is to be limited to the type of mechanism designated by the trade as such, and is to be sharply distinguished from the well known rice bran reels.

The inlet of the aspirating fan 21 is connected to the shaft 27, providing suction to shafts 28 and 26. The discharge trunk 29 leads from the outlet of the fan 22 to a dust collector 22 arranged with a conveying pipe 23 for the waste from the mill which is collected in receiver connected to conveyor 16.

It will be understood that although only one aspirating fan is shown in this form, independent fans may be provided at various places in the ducts 11, 5 or 26 as for example it has been found well to insert a fan at point 23. These fans may then be independently controlled and any desired draft thereby obtained. In practice it is also very satisfactory to use a fan in duct 11 at a point just beyond the junction of ducts leading from suction funnels 9 and 10, and another fan in duct 5 at a point just beyond the junction of the ducts leading from suction funnels 3 and 4. These fans relieve the load on fan 21 and produce a more positive draft through first break hullers A—A' and second hullers C—C'.

While the form of the invention is believed to be the preferable embodiment thereof, it is nevertheless understood that minor changes may be made therein, and that various rearrangements of the supply or air ducts may be made without departing from the spirit and scope of the invention as claimed.

I claim:

1. Those steps in the process of milling rice which consists in first partially removing the bran from the grain and during said action carrying off loose bran, cellular material and dust by a current of air, and then spreading and agitating the rice and during said action carrying off loosened bran, cellular material and dust by a current of air.

2. That process of milling rice which consists in passing the rice through a huller to loosen the bran therefrom, and passing the rice from the huller to an aspirator, independent of the huller where the bran is removed from the rice at a predetermined suction.

3. That process of milling rice which consists in passing the rice through a hulling unit to loosen the bran therefrom, subjecting the rice within the hulling unit to pneumatic action to partially remove the bran therefrom, and passing the rice to an aspirating unit to remove the remaining bran therefrom.

4. That process of milling rice which consists in subjecting the rice to a hulling action to loosen the bran therefrom, passing the rice from the huller to an aspirator, passing the rice from the aspirator to a second huller to further loosen the bran from the rice, and passing the rice from the second huller to a second aspirator.

5. That process of milling rice which consists in subjecting the rice to a hulling action to loosen the bran therefrom, passing the rice from the huller to an aspirator, passing the rice from the aspirator to a second huller to further loosen the bran from the rice, and passing the rice from the second huller to a second aspirator, said rice and the bran therewith being subjected to predetermined suctions in the first and second mentioned hullers to partially segregate the bran from the rice kernels.

6. That process of milling rice which consists in consecutively passing the rice through a huller to break the bran therefrom, a series of aspirators to partially remove the bran from the rice kernels, a second huller to break the remaining bran from the rice kernels, and a second series of aspirators to segregate the remaining bran from the rice kernels.

7. That process of milling rice which consists in consecutively passing the rice through a huller to break the bran therefrom, a series of aspirators to partially remove the bran from the rice kernels, a second huller to break the remaining bran from the rice kernels, and a second series of aspirators to segregate the remaining bran from the rice kernels, said rice and the bran mixed therewith being subjected to predetermined suction within the first and second mentioned hullers to segregate the bran therefrom.

8. That process of milling rice which consists in subjecting the rice to action within hullers having a relatively strong suction therein to break the bran from the rice kernel and partially segregate the bran from the kernel, and passing the rice from the hullers through a plurality of aspirators wherein the rice is subjected to a light suction to segregate remaining bran from the rice kernels.

9. That process of milling rice which consists in passing cargo rice through a huller under a relatively strong suction to break the bran from the kernels and partially segregate the same therefrom, passing the rice from the huller to an aspirator wherein the same is disposed in a thin even sheet and subjected to a light suction for partially segregating the bran from the rice kernels, passing the rice from the aspirator to a second huller, wherein the rice is subjected to a hulling action under a relatively strong suction to remove the remaining bran from the kernels and segregate loosened bran from the kernels, and passing the rice from the second huller to a second aspirating action wherein the rice is subjected to gentle action under light suction for segregation of bran from the kernels.

10. That process of milling rice which consists in passing the cargo rice through a huller under predetermined suction to break and partially segregate the bran from the kernels of the rice, passing the rice from the huller to an aspirator wherein the bran is subjected to light predetermined suction for segregation of the bran from the rice kernels, passing the rice from the aspirator to a second huller to loosen and partially segregate the bran from the rice kernels, and passing the remaining rice to a second aspirator wherein, under predetermined light suction, the remaining bran is segregated from the rice kernels.

GEORGE M. MILES.